United States Patent [19]

Ichiki et al.

[11] Patent Number: 5,854,161
[45] Date of Patent: Dec. 29, 1998

[54] PROCESS FOR THE REGENERATION OF A CATALYST

[75] Inventors: Tatsumi Ichiki, Kanagawa; Nagato Hamashima; Teiji Nakamura, both of Tokyo; Masayuki Asami, Saitama; Sadakatsu Suzuki, Saitama; Hiroshi Ueno, Saitama, all of Japan

[73] Assignees: ABB Lummus Global Inc., Bloomfield, N.J.; Lonza Societa Per Azioni, Milan, Italy; Tonen Chemical Corporation, Tokyo, Japan

[21] Appl. No.: 973,942
[22] PCT Filed: Apr. 24, 1996
[86] PCT No.: PCT/US96/05688
  § 371 Date: Oct. 10, 1997
  § 102(e) Date: Oct. 10, 1997
[87] PCT Pub. No.: WO96/33804
  PCT Pub. Date: Oct. 31, 1996
[51] Int. Cl.$^6$ .............................. B01J 20/34; B01J 38/04; B01J 38/30
[52] U.S. Cl. .................................. 502/41; 502/20; 502/34
[58] Field of Search .................................. 502/20, 34, 41

[56] References Cited

U.S. PATENT DOCUMENTS 2,833,699  5/1958  Dicks et al. .............................. 196/52
5,120,691  6/1992  Pontier et al. ............................ 502/44

*Primary Examiner*—Gary P. Straub
*Assistant Examiner*—Alexander G. Ghyka
*Attorney, Agent, or Firm*—Alix, Yale & Ristas, LLP

[57] ABSTRACT

A process is provided for the regeneration of a vanadium-phosphorus oxide catalyst which has been used in a process for the preparation of maleic anhydride by oxidizing butane. The used catalyst particles are removed from the fluidized bed reactor and subjected to impact with each other and/or with structural surfaces such that the deteriorated layer is peeled away. Various forms of equipment may be employed such as pneumatic classifiers, jet mills and jetted fluidized beds.

6 Claims, 4 Drawing Sheets

PROCESS FOR THE REGENERATION OF A CATALYST

CROSS-REFERENCE TO RELATED APPLICATIONS

This is the national stage of International Application No. PCT/US96/05688 filed Apr. 24, 1996.

The present invention relates to a process for treating a catalyst used in a process for the preparation of maleic anhydride by oxidizing a hydrocarbon having four carbon atoms in a reactor, particularly in a fluidized bed reactor, when the activity of the catalyst has decreased during use.

BACKGROUND OF THE INVENTION

It has been known that maleic anhydride is prepared by oxidizing a hydrocarbon having four carbon atoms using a vanadium-phosphorus oxide catalyst, often called a V-P-O catalyst, in a fluidized bed reactor. In this process, a problem is that the catalytic activity decreases with time. Then, if the reaction temperature is raised to maintain the same level of conversion, the yield of maleic anhydride decreases. Accordingly, various processes have been tried for the regeneration of the catalyst. For example, the known methods include increasing the valence of the vanadium to 3.9 to 4.6 using sulfur trioxide, by which the catalytic activity is partly regenerated (U.S. Pat. No. 4,123,442); removing inactive vanadium from the catalyst using the action of a halogen or an organic halide (U.S. Pat. No. 4,020,174); treating the catalyst with a reducing gas such as hydrogen, carbon monoxide, etc. (UK Patent No. 1,439,489); bringing the catalyst into contact with aqueous ammonia or an amine (UK Patent No.1,512,305); and adding a phosphorus compound to the catalyst (U.S. Pat. Nos. 3,296,282 and 3,474,041 and UK Patent No. 1,291,354). However, these methods are unsatisfactory. For instance, when a phosphorus compound is added, the selectivity is improved but the activity is reduced requiring a higher reaction temperature.

Japanese Patent Application Laid-Open No. Hei-5-329381 discloses a method where the catalyst particles used in a fluidized bed reactor are de-agglomerated or a method where the surface of the catalyst particles in a fluidized bed reactor is re-exposed, wherein a high speed gas is blown onto the catalyst particles while they are in a fluidized state in a fluidized bed reactor whereby the surface of the particles is polished due to the collision of the particles. In Japanese Patent Application Laid-Open No. Hei-4-316567, a method is disclosed where the catalyst is taken out of a fluidized bed reactor and then crushed to expose the active surface of the catalyst which is then put back into the reactor.

SUMMARY OF THE INVENTION

A purpose of the present invention is to provide an improved process for the efficient regeneration of a V-P-O type catalyst to improve conversion, yield and selectivity. The present invention provides a process for improving the activity of a catalyst used in a process for the preparation of maleic anhydride by oxidizing a hydrocarbon having four carbon atoms, wherein the catalyst comprises oxide compounds of vanadium and phosphorus, and wherein at least a part of the catalyst particles are removed from the reactor and a deteriorated and inactive layer on the surface of the catalyst particles is removed by the use of a gas flow which causes collisions between the catalyst particles and usually between the particles and an impact surface with sufficient force to cause the inactive layer to be removed. This may involve the use of a gas stream, such as air, of sufficient force in a pneumatic classifier, the use of a high pressure gas flow jetted from a nozzle in a jet mill to cause collision with a baffle or by subjecting the particles to a high speed gas flow which is jetted into the particles to form a jetted bed whereby the particles collide to polish and remove the inactive layer.

DESCRIPTION OF THE PREFERRED EMBODIMENTS

Figure 1:
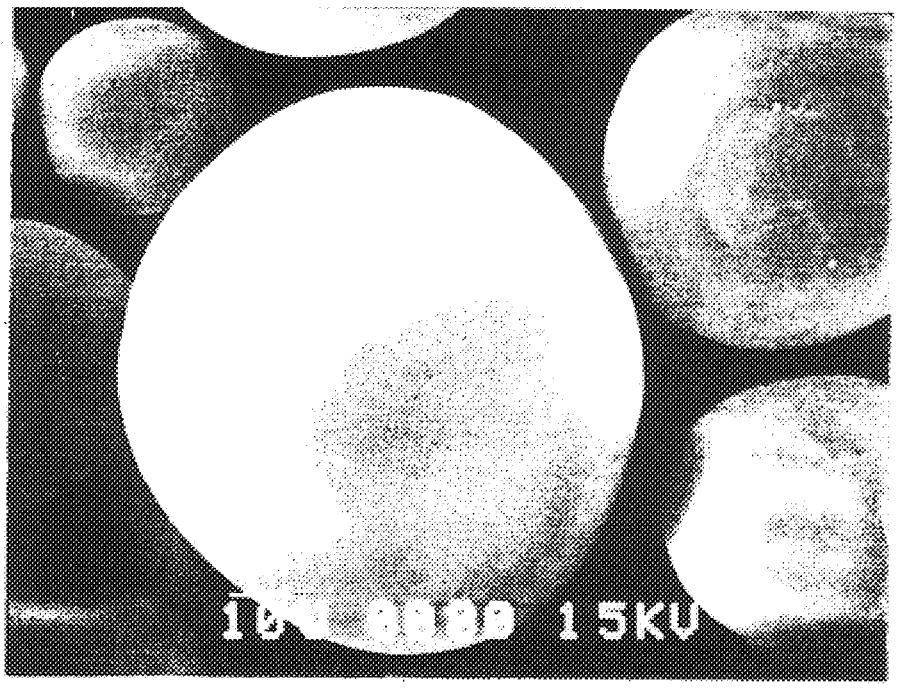
FIGS. 1, 2 and 3 are photomicrographs which show the structure of several catalyst particles before the present regeneration.

A process for the preparation of maleic anhydride by oxidizing a hydrocarbon having four carbon atoms in a fluidized bed reactor is known per se. The hydrocarbon having four carbon atoms is butane such as n-butane and isobutane. The oxidation reaction may be carried out in a manner which is known per se. The reaction is preferably carried out at a reaction temperature of 340° to 500° C., a reaction pressure of 0 to 5 $kg/cm^2$ G and a butane concentration of 0.5 to 6.0 mole %. It is preferred that the composition of the reaction gas is below an explosion limit.

The catalyst used in the invention comprises oxide compounds of vanadium and phosphorus, often referred to as a V-P-O catalyst, where the activity of the catalyst has decreased during use. The catalyst contains crystalline vanadium-phosphorus mixed oxides as an active component where an atomic ratio of phosphorus to vanadium (P/V) is preferably 0.9 to 2.2/1, more preferably 1 to 1.5/1. For example, one such catalyst has a main crystalline component of divanadyl pyrophosphate. The catalyst may or may not contain carriers such as $SiO_2$, $Al_2O_3$, and $TiO_2$. In addition, the catalyst may also contain elements such as Li, B, Si, Ti, Cr, Mn, Fe, Co, Ni, Cu, Zn, Zr, Mo, Sn, Hf and Bi as a co-catalyst component or a strength improving component. The particle size of the catalyst before use is generally 1 0 to 500 microns.

These V-P-O catalysts may be prepared by known methods, for example, a method where a catalyst precursor is prepared by reducing divanadium pentaoxide with hydrochloric acid, oxalic acid, hydrazine, etc. in the presence of phosphoric acid, which is then calcined (Japanese Application Laid-Open No. Sho-54-120273/1979 and U.S. Pat. No. 4,085,122); and a method where divanadium pentaoxide is reduced in a substantially anhydrous organic solvent, which is then heated in the presence of phosphoric acid to obtain a precursor which is then calcined (Japanese Publication Sho-57-8761/1982 and Japanese Publication Hei-1-50455/1989).

In the present invention, the used catalyst particles with the inactive layer on the catalyst surface are removed from the reactor and subjected to forces which cause the particles to collide with each other or with an impact surface or both so as to cause the inactive layer to be removed.

In the first embodiment of the present invention, the catalyst to be regenerated is taken out of the reactor and subjected to pneumatic classification under such conditions that the deteriorated layer on the catalyst surface is selectively peeled off. The pneumatic classification of the catalyst particles is preferably carried out in a dry process. In a wet process, the catalyst may sometimes change in quality because the catalytic component is eluted during the pneumatic classification. The dry process for the pneumatic classification is carried out preferably using gas flow forces in combination with centrifugal force, inertial force or gravity. Particularly preferred is a classifier where classification is carried out by the combined action of centrifugal force and gas or wind force. Such classifiers include a microseparator, a turbo classifier, a microprex, a multiprex zigzag classifier, a super separator, an accurecut, etc.

The conditions for the classifier are selected so that the deteriorated layer on the catalyst surface is selectively peeled off but the energy is not enough to destroy the basic particle. In the pneumatic classification, a classification point is generally decided depending on the combined effects of the wind force and the centrifugal force. The wind force is controlled by the amount of a gas flow generated by a blower, etc. and centrifugal force is controlled by the speed of rotation of the classifiers rotor. Generally, as the amount of a gas flow is increased, the classification point is higher; and as the speed of rotation is increased, the classification point is lower. The classification precision may be changed by the combination of the amount of the gas flow and the rotation speed with approximately a constant classification point. When both the amount of the gas flow and the rotation speed are increased, the classification precision is improved. However, in such a case, the energy added to the particles to be regenerated would be large and, therefore, the particles might be destroyed during the classification.

In the present invention, it has been found that when the energy added to the particles is sufficient in the aforesaid classification of the particles, the surface of the particles can be peeled off. The peeling of the particle surface and destruction of the particles may be caused by collision among the particles or between the particle and an inner wall of the classifier. Particularly, the peeling and the destruction seem to be caused mainly by collision between the particle and the inner wall of the apparatus in the neighborhood of a rotor rotating at a high speed. Factors influencing the extents of the peeling and the destruction include the amount of the gas flow and the rotation speed as well as factors such as the rotor size, the materials of the wall of the apparatus, physical properties of the particles such as strength, the composition of the particles, the size and shape of the particles and the amount of particles fed per unit of time. Accordingly, the conditions for the selective peeling of the deteriorated layer on the particle surface are decided taking into account such factors. The regeneration treatment according to the present invention may be carried out, for example, in the following conditions.

The pressure in the treatment is not particularly limited, but operations are easier with at least atmospheric pressure. The temperature is not particularly limited and may be room temperature. Alternatively, the pneumatic classification may be linked to the maleic anhydride preparation process and carried out at a temperature approximately equal to the reaction temperature.

The composition of the gas flow used in the pneumatic classification of the catalyst particles is not particularly limited as long as it does not cause adverse effects, such as decrease the activity. Air is the least expensive but nitrogen, oxygen, rare gases, carbon dioxide, steam, or hydrocarbons alone or as a mixture can be used. A gas mixture of butane and air, or a reactor outlet gas may also be used.

The materials of the apparatus are not particularly limited as long as they do not have an adverse influence on the particles. Stainless steels, carbon steels, etc. may be used. In some cases, lining materials such as urethane, polypropylene and Teflon may be used. For example, when a rotor with a urethane lining on stainless steel is used, the extents of the peeling and the destruction of the catalyst surface may sometime be less than those with no lining, depending on the kind of particles.

The present invention will be described in a case where a turbo classifier, such as the air classifier available from Nisshin Engineering Company, is used. In this apparatus, gas streams referred to as channel gas are used for the purpose of effective separation between coarse powder and fine powder. The gas composition is not particularly limited as long as it does not have an adverse influence on the particles. The channel gas pressure depends on the pressure in the classification. When the pressure in the classification is near atmospheric pressure, a pressure of 1 to 3 kgf/cm$^2$ may be selected in general for the channel gas. The throughput of the particles per unit of time is not particularly limited within the capacity of a specific apparatus. It is preferred that the following inequality is met:

$$9 \leq \frac{\sqrt{Q \times N \times f}}{\sqrt{D \times 1000}} \leq 30$$

wherein N represents the rotation speed in rpm and $700 \leq N < 7000$; Q represents the amount of the gas flow in m$^3$/min. and $1 \leq Q \leq 400$; D represents the rotor diameter in meters and $0.1 \leq D \leq 2$; f=1 when no lining is provided on the rotor part, and f=0.8 when a resin lining is provided on the rotor part.

In this inequality, if the value is larger than 30, the proportion of the particles which are heavily destroyed may sometimes be too large. If the value is below 9, no peeling of the deteriorated layer on the particles may occur.

In the following Table 1 there are shown the ranges of the treatment conditions in the case where turbo classifiers TC-15N (rotor diameter of 15 cm) and TC-60 (rotor diameter of 60 cm) are used with a rotor part of stainless steel without a lining. However, as preferred conditions depend on strength, composition, particle size, etc. of the particles, the conditions are not limited to these ranges.

TABLE 1

| Conditions | TC-15N | TC-60 |
| --- | --- | --- |
| Rotation speed range, rpm | 3,000–10,000 | 600–3,000 |
| Preferred rotation speed range, rpm | 4,000–6,000 | 1,000–2,200 |
| Gas flow range, m$^3$/min. | 1–4 | 30–80 |
| Preferred gas flow range, m$^3$/min. | 2–3 | 40–70 |

In the pneumatic classification according to the invention, the deteriorated layer on the catalyst surface is peeled off and, furthermore, at least a part of the deteriorated layer peeled may be separated and recovered as a fine powder depending on the classification conditions. The proportion of the amount of the particles recovered as fine powder in the fine powder outlet of the air classifier to the amount of the particles fed to the classifier depends on the extent of the peeling or destruction of the particles and the classification point which depends on the amount of the gas flow and the rotation speed. When the classification point is raised by increasing the amount of the gas flow or by decreasing the rotation speed, a major part of the deteriorated layers peeled off may be separated and removed, but, at the same time, an increasing proportion of small particles which would be useful for the reaction may also be removed. Accordingly, although the fine powder recovered is generally dumped because of its low activity, a part or the whole of it may be used in the reaction together with the coarse powder recovered in the coarse powder outlet of the classifier, if necessary. Alternatively, one may select conditions to attain such a low classification point that the aforesaid fine powder is not substantially recovered.

For the sake of improved safety, the reaction gas in the reactor may be replaced with other gases such as the aforesaid gases before the catalyst is taken out of the reactor, or a gas accompanying the catalyst particles taken out of the reactor may be replaced with other gases before the classification is carried out.

In the present regeneration, almost no destruction of the catalyst particles happens and only the deteriorated layer on the surface is selectively peeled off. Consequently, it seems that the fresh active part of the catalyst particle is exposed, whereby the catalytic activity may be improved.

The present process may be carried out continuously or batchwise. In the continuous process, it is preferred that the catalyst is continuously drawn out from the fluidized bed reactor operating for the preparation of maleic anhydride and subjected to the pneumatic classification, while the catalyst particles regenerated are put back in the fluidized bed reactor.

CLASSIFIER EXAMPLES

The present invention will be illustrated more specifically by means of the following Examples. Maleic anhydride is represented as "MAH" hereinafter.

The conversion of n-butane, the yield of MAH and the selectivity to MAH are calculated as follows:

Conversion of n-butane=(molar concentration of butane at an inlet of the reactor minus molar concentration of butane at an outlet of the reactor)÷(molar concentration of butane at an inlet of the reactor)×100

Yield of MAH=(moles of MAH generated per unit time)÷(moles of butane fed per unit time)×100

Selectivity to MAH=(yield of MAH)÷(conversion of n-butane)×100

Example 1

(1) Preparation of a Catalyst

The sample catalyst used was a V-P-O catalyst which had been used for about two years in a reaction where n-butane was air oxidized into maleic anhydride in a fluidized bed reactor whereby its activity was reduced.

(2) Pneumatic Classification

Six thousand grams of the sample catalyst were classified using a precision air classification turbo classifier TC-1 5N from Nisshin Engineering Company without any lining under the conditions of room temperature, a rotor rotation speed of 5,000 rpm, air in the amount of 2.0 m$^3$/min. and a channel air pressure of 2.0 kgf/cm$^2$. This produced 5,980 g of regenerated catalyst.

Figure 4:
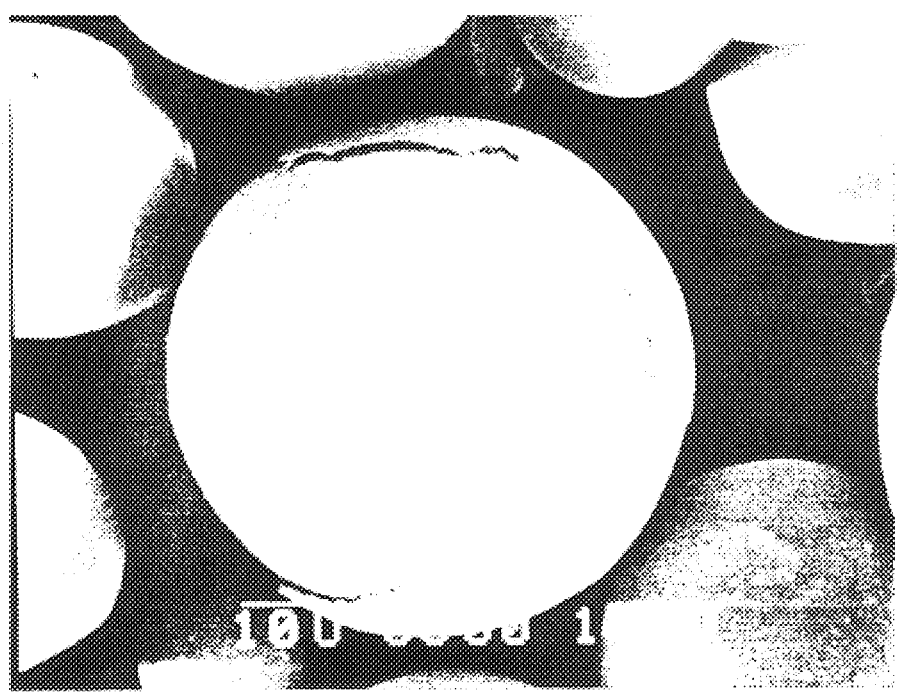
FIG. 4 is a photomicrograph which shows the structure of the catalyst particles after being subjected to regeneration in a pneumatic classifier.
Figure 5:
FIG. 5 is a photomicrograph which shows the magnified fine powder which has been removed during the regeneration by pneumatic classification.

The sample catalyst obtained was observed with a scanning electron microscope at a magnification of 800 and recorded in a photograph. The catalyst before the regeneration is shown in FIG. 1; the catalyst after the regeneration in FIG. 4; and the fine powder removed from the catalyst in the regeneration in FIG. 5. It can be seen that a deteriorated layer on the particle surface is flaky and removed without destruction of the catalyst particles according to the present regeneration. The fine powder removed contains a lot of flakes together with the fine particles. Destroyed catalyst particles are not observed.

(3) Activity Test

One gram of the above sample catalyst was loaded into a fixed bed reactor. The reaction was carried out under the conditions of atmospheric pressure, a GHSV of 1500 hour$^{-1}$, a reaction temperature of 430° C. and an n-butane concentration in air of 1.5 mole %. The n-butane concentrations in the inlet gas and the outlet gas of the reactor were determined quantitatively by gas chromatography showing a conversion of butane of 62 mole %. The resultant MAH was absorbed in water by introducing the outlet gas in 20 to 50 ml of water for 30 to 60 minutes, which was then titrated with an aqueous 0.1N sodium hydroxide solution to obtain the yield of MAH. The yield of MAH was 40 mole %. The selectivity to MAH was 65 mole %.

Comparison Example 1

One gram of the sample catalyst in Example 1 (1) was used for the same activity test as in Example 1 (3) without the pneumatic classification. As a result, the conversion of n-butane was 49 mole %, the yield of MAH was 31 mole % and the selectivity of MAH was 63 mole %.

Comparison Example 2

One gram of the fine powder removed form the sample catalyst in the pneumatic classification in Example 1 (2) was used for the same activity test as in Example 1 (3). As a result, the conversion of n-butane was 38 mole %, the yield of MAH was 25 mole % and the selectivity to MAH was 66 mole %. The activity of the fine powder was much lower than any catalyst before or after the pneumatic classification showing that the fine powder is from the deteriorated layer on the catalyst.

Example 2

Using the regenerated catalyst obtained in Example 1 (2), the activity test was carried out as follows:

One hundred and fifty grams of the sample catalyst were loaded into a fluidized bed reactor. The reaction was carried out under the conditions of atmospheric pressure, a GHSV of 300 hour$^{-1}$, a reaction temperature of 430° C. and an n-butane concentration in air of 4 mole %. As a result, the conversion of n-butane was 65 mole %, the yield of MAH was 42 mole % and the selectivity to MAH was 65 mole %.

Comparison Example 3

One hundred and fifty grams of the sample catalyst in Example 1 (1) were used without pneumatic classification for the same activity test as in Example 2. As a result, the conversion of n-butane was 60 mole %, the yield of MAH was 36 mole % and the selectivity to MAH was 60 mole %.

From the results of the above activity tests, it can be seen that when the maleic anhydride reaction is carried out with the regenerated catalyst according to the invention either in a fixed bed reactor or in a fluidized bed reactor, the catalytic activity is improved compared to that before the regeneration.

Example 3

(1) Preparation of a Catalyst

The same sample catalyst as in Example 1 (1) was used.

(2) Pneumatic Classification

One hundred grams of the sample catalyst were classified using the same turbo classifier TC-15N without lining as in Example 1 under the conditions of room temperature, a rotation speed of 6,000 rpm, air in the amount of 1.0 m³/min. and a channel air pressure of 2.0 kgf/cm². The pneumatic classification was carried out in such a way that peeling occurred but no fine powder was removed. This produced 100 g of regenerated catalyst.

The sample catalyst obtained (coarse powder) was observed with a scanning electron microscope at a magnification of 800 similar to Example 1 (2). It was observed that the surface layer of the catalyst had been peeled off.

(3) Activity Test

One gram of the above sample catalyst was used for the same activity test as in Example 1 (3). As a result, the conversion of n-butane was 65 mole %, the yield of MAH was 41 mole % and the selectivity to MAH was 63 mole %.

From the above results, it can be seen that in the case where the classification is carried out under conditions that the deteriorated layer on the catalyst surface is peeled, but no fine powder is removed, the catalytic activity is improved.

Comparison Example 4

(1) Preparation of a Catalyst

The same sample catalyst as in Example 1 (1) was used.

(2) Pneumatic Classification

The pneumatic classification was carried out under conditions such that classification took place, but no peeling occurred. One hundred grams of the sample catalyst were classified using a turbo classifier TC-15N which was the same as the one used in Example 1 with the exception that it had a urethane lining under the conditions of room temperature, a rotation speed of 1,500 rpm, air in the amount of 3.0 m³/min. and a channel air pressure of 2.0 kgf/cm². There were obtained 75 g of coarse powder and 25 g of fine powder.

The sample catalyst obtained was observed with a scanning electron microscope at a magnification of 800 similar to Example 1 (2). No peeling of the surface layer of the catalyst was observed.

(3) Activity Test

One gram of the above coarse powder was used for the same activity test as in Example 1 (3). As a result, the conversion of n-butane was 52 mole %, the yield of MAH was 33 mole % and the selectivity to MAH was 63 mole %.

(4) Repeated Pneumatic Classification and Activity Test

Subsequently, 74 g of the remaining coarse powder was subjected to the pneumatic classification in the same conditions as in (2) above to obtain a coarse powder which was then treated again. That is, the treatment was carried out three times. Finally, 73 g of coarse powder was obtained. No peeling of the surface layer of the catalyst was observed with a scanning electron microscope. One gram of the sample catalyst thus obtained was used for the same activity test as in (3) above. As a result, the conversion of n-butane was 53 mole %, the yield of MAH was 34 mole % and the selectivity to MAH was 64 mole %.

From the above results, it is seen that when the classification is carried out under such conditions that no peeling of the catalyst surface occurs and, however, fine powder is removed, the catalytic activity is somewhat improved by removing the fine powder which has an adverse influence on the activity, and repetition of the same treatment attains almost no improvement of the activity.

Example 4

(1) Preparation of a Catalyst

The same sample catalyst as in Example 1 (1) was used.

(2) Pneumatic Classification

One hundred grams of the sample catalyst were classified using the same turbo classifier TC-15N without a lining as in Example 1 under the conditions of room temperature, a rotation speed of 4,000 rpm, air in the amount of 2.0 m³/min. and a channel air pressure of 2.0 kgf/cm². This produced 98 g of coarse powder.

(3) Activity Test

One gram of the above coarse powder was used for the same activity test as in Example 1 (3). As a result, the conversion of n-butane was 59 mole %, the yield of MAH was 38 mole % and the selectivity to MAH was 64 mole %.

(4) Repeated Pneumatic Classification and Activity Test

Subsequently, 97 g of the remaining coarse powder was subjected to the pneumatic classification under the same conditions as in (2) above to obtain a coarse powder which was then treated again. That is, the treatment was carried out three times. Finally, 93 g of coarse powder was obtained. One gram of the sample catalyst thus obtained was used for the same activity test as in (3) above. As a result, the conversion of n-butane was 71 mole %, the yield of MAH was 46 mole % and the selectivity to MAH was 65 mole %.

From the above results, it is seen that when the present regeneration is repeatedly carried out, the catalytic activity is increasingly improved with every treatment.

Turning now to the embodiment of the present invention employing a jet mill, the jet mills used may include the types commonly known as jet air collision types, baffle types and fluidized bed types. Jet mills are usually used for the minute crushing of particles to a particle size on the order of a micrometer, and characterized by less abrasion of particles. In contrast, the crushing of the catalyst particles is avoided as much as possible in the invention and the inactive layer on the particle surface is removed. Accordingly, the speed of the jet gas flow or the treating time must be less in the present invention than would be usual for minute crushing. For instance, in the preferred case of a fluidized bed type jet mill, an index of the treating energy, E, preferably meets the following inequality:

$$2.5 \times 10^7 < E < 5.0 \times 10^8$$

wherein E=(jetting speed of the gas in m/sec)²×treating period in sec.

More preferably, E meets the following inequality:

$$5.0 \times 10^7 < E < 5.0 \times 10^8.$$

For other types of jet mills, the conditions which cause removal of the inactive layer from the catalyst particles without minute crushing of the catalyst particles can be easily determined.

In contrast to the jet mills of the present invention, in the process disclosed in the above-cited JP Application Laid-Open Hei-5-329381, a high speed gas is jetted from a nozzle located at a center of a fluidized bed while the bed of catalyst particles are maintained in a fluidized state in the reactor. Therefore, collisions between the particles caused by the high speed gas take place only in places relatively close to the nozzle. In addition, a frequency distribution of collisions of the particles is broad because the whole fluidized bed in the reactor is fluidized. Accordingly, the treating period must be long, and some particles may be subjected to excessive collisions and be crushed, while some other particles may receive insufficient collisions to remove the inactive layer. The present invention does not have such drawbacks.

Air might be used economically as the jetting gas, but this is not limitative. As mentioned above, the catalyst particles collide with relatively equal frequency. It has now been found that the surface of the catalyst particles is peeled thin by such proper collisions. It is believed that this makes the whole surface of the catalyst fresh to restore the catalytic activity. In addition, it has also been found that the selectivity is restored, too.

The treatment according to the invention is not intended to crush the particles. The particle size distribution is almost unchanged by the treatment. The surface of the catalyst is peeled to generate very fine particles, which are preferably classified and removed. The classification may be conducted in a classifier, e.g., cyclone, built in the jet mill. Alternatively, a classification step may be separately conducted after the treatment. It is also possible to place the entire substance as treated in a fluidized bed reactor and conduct the classification in the reactor.

The present process may be carried out continuously or batchwise. In the continuous process, the catalyst is continuously drawn out from the fluidized bed reactor operating for the preparation of maleic anhydride and supplied to a jet mill, while the regenerated catalyst particles are continuously withdrawn from the jet mill and recycled back to the fluidized bed reactor.

JET MILL EXAMPLES

Comparison Example 1

One milliliter of a V-P-O catalyst was subjected to an activity test without any treatment. This catalyst had been used for a long period of time in a fluidized bed reactor in a system for the preparation of maleic anhydride by oxidation of butane and the activity had decreased. The reaction is conducted in a fixed bed flow reactor under the test condition of: SV of 1,200 hr$^{-1}$; butane concentration of 1.5%; normal atmospheric pressure and a temperature of 430° C.

The conversion of butane was 47%, and the selectivity to maleic anhydride was 65%.

Example 1

A fluid bed type jet mill, known as a Counter Jet Mill 200 AFG by Hosokawa Micron Co. was used. Ten kg of the same catalyst with a lowered activity as used in Comparison Example 1 were subjected to the regeneration treatment. Air pressure to the nozzle was set at 1 kg/cm$^2$G with a jetting speed of 290 m/sec. The treatment was continued for one hour. Thus, E was 3.0×10$^8$.

Figure 2:
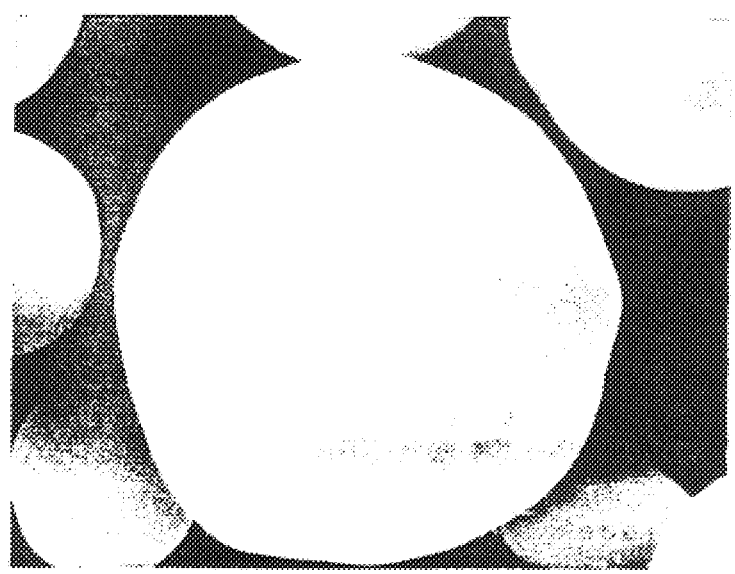
Figure 6:
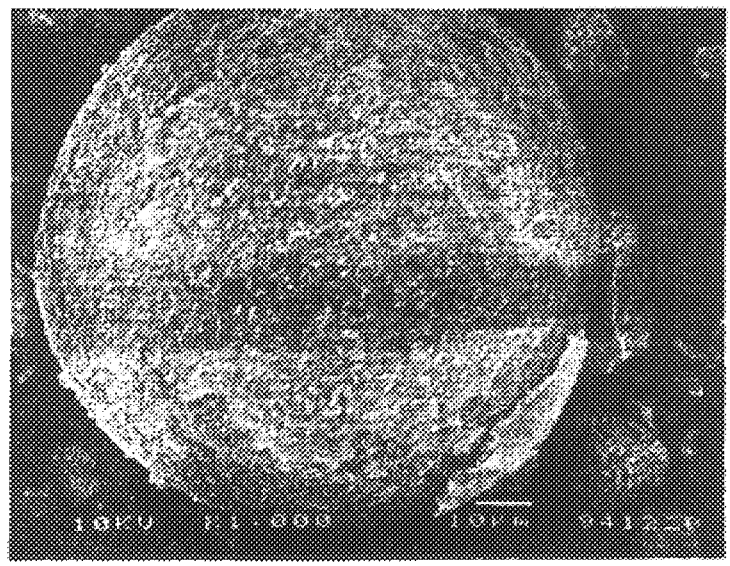
FIG. 6 is a photomicrograph which shows a catalyst particle after regeneration in a jet mill.

The particle size distribution was determined on the treated catalyst particles. The average particle size decreased by approximately 2 μm, compared to that before the treatment, but no large change was seen in the particle size distribution. The catalyst particles after the treatment were observed by a scanning electron microscope. FIG. 2 is a photograph of the catalyst before the treatment of the invention at a magnification of 750. FIG. 6 is a photograph of the catalyst after treated at a magnification of 1,000. It is seen that no significant crushing of the catalyst particles took place and the surface of the particles was uniformly peeled away.

The activity of the catalyst after the regeneration treatment was determined in the same fixed bed flow reactor and under the same conditions as for the activity test as used in the Comparison Example. The conversion of butane was 59%, and the selectivity to maleic anhydride was 67%.

Example 2

The procedures of Example 1 were repeated with the exception that the air pressure to the nozzle was 2 kg cm$^2$G at a jetting speed of 480 m/sec and the treating period was 30 minutes. Thus, E was 4.1×10$^8$. The particle size distribution was determined on the treated particles. The average particle size decreased by approximately 3 μm, compared to that before the treatment, but no large change was seen in the particle size distribution. The activity of the catalyst after the treatment was determined under the same conditions as in Comparison Example 1. The conversion of butane was 64%, and the selectivity to maleic anhydride was 66%.

Example 3

The procedures of Example 1 were repeated with the exception that the air pressure to the nozzle was 3 kg/cm$^2$G at a jetting speed of 650 m/sec and the treatment period was 5 minutes. Thus, E was 1.3×10$^8$. The average particle size decreased by approximately 1 μm, compared to that before the treatment, but no large change was seen in the particle size distribution. The activity of the catalyst after the treatment was determined under the same conditions as in Comparison Example 1. The conversion of butane was 69%, and the selectivity to maleic anhydride was 65%.

Example 4

The procedures of Example 1 were repeated with the exception that the air pressure to the nozzle was 6 kg/cm$^2$G at a jetting speed of 1170 m/sec and the treating period was 1 minute. Thus, E was 8.2×10$^7$. The average particle size decreased by approximately 1 μm, compared to that before the treatment, but no large change was seen in the particle size distribution. The activity of the catalyst after the treatment was determined under the same conditions as in Comparison Example 1. The conversion of butane was 57%, and the selectivity to maleic anhydride was 65%. The results of these examples are listed in Table 2.

TABLE 2

| Example | Jetting Speed, m/sec | Treating period, min | E | Conversion of Butane, % | Selectivity to Maleic Anhydride, % |
|---|---|---|---|---|---|
| 1 | 290 | 60 | 3.1 × 10$^8$ | 59 | 67 |
| 2 | 480 | 30 | 4.1 × 10$^8$ | 64 | 66 |
| 3 | 650 | 5 | 1.3 × 10$^8$ | 69 | 65 |
| 4 | 1170 | 1 | 8.2 × 10$^7$ | 57 | 65 |
| Comp. Ex. 1 | — | — | — | 47 | 65 |

Comparison Example 2

The procedures of Example 1 were repeated with the exception that the air pressure to the nozzle was 6 kg/CM$^2$G at jetting speed of 1170 m/sec and the treating period was 10 minutes. Thus, E was 8.2×10$^8$. It was determined that the particle size distribution had changed significantly. The catalyst after the treatment was observed to find that the catalyst was crushed significantly. Thus, the treatment by the jet mill was excessive, so that crushing took place as in usual jet mill operations, instead of the mere removal of the surface of the catalyst particles.

In the jetted bed version of the present invention, the catalyst to be regenerated is put in a treating vessel in which a high speed gas flow is introduced continuously or batchwise at the lower part of the vessel whereby a jetted bed is formed in the catalyst bed to cause collision among the catalyst particles. As the high speed gas, any gases such as air, nitrogen, steam, etc., may be used which may be at ambient temperature or heated.

In a jetted bed, a high speed gas flow is jetted into the catalyst bed to be regenerated and the gas flow spouts out the top of the catalyst bed. Accordingly, the catalyst bed may generally be divided into two parts, i.e., a jet part in which the particle density is lower and a particle-rich part in which the particle density is higher. In the particle-rich part, the particles flow in the direction opposite to the flow of particles in the jet part. As a result, the particles are continuously circulated.

The surface of the catalyst is polished due to collision among the particles in the jet part or in the interfacial part between the jet part and the particle-rich part. In the jetted bed, the latter type of collision occurs particularly with high frequency and the particles circulate regularly in the bed as a whole. Accordingly, the polishing by collision takes place efficiently. In contrast, in the method disclosed in the aforesaid JP Application Laid-Open Hei-5-329381, the high speed gas is directed from a gas nozzle placed in the center of the fluidized bed, while all of the catalyst particles are maintained in a fluidized state. Accordingly, the collision of the particles caused by the high speed gas takes place relatively only in the neighborhood of the nozzle and, moreover, the whole fluidized bed is in the mixed state. Therefore, the probability distribution for each particle to collide is low. Therefore, the treating time is necessarily long. Some particles are subjected to excessive collisions so as to break, while some particles receive an insufficient number of collisions. The present invention does not suffer such disadvantages.

The catalyst particles in the jetted bed are subjected to relatively equal frequency. It is found that as a result, the surface of the catalyst particles is polished and exfoliated of the reduced activity catalyst layer. This makes the entire surface of the catalyst fresh, whereby the catalytic activity is recovered. The present treatment is not made for the purpose of crushing the particles. The particle size distribution of the catalyst changes little during the treatment. The exfoliation of the surface of the catalyst by the present treatment produces a very fine dust. It is preferred to remove the very fine dust by classification which may be carried out in a classifier, such as a cyclone, connected to the treatment vessel. Alternatively, the classification process may be carried out separately after the treatment. It is also possible to put all of the treated catalyst as such in a fluidized bed reactor without the classification, and then the classification takes place in the reactor.

The process according to the invention may be carried out continuously or batchwise. In a continuous process, the catalyst particles are continuously taken out of a fluidized bed reactor in operation for preparing maleic anhydride and then supplied to the apparatus according to the invention, wherein the catalyst particles are subjected to the regeneration treatment, after which they are continuously taken out of the apparatus and returned to the fluidized bed reactor.

JETTED BED EXAMPLES

Comparison Example

The sample used was one milliliter of a V-P-O catalyst which had been used for a long time in a fluidized bed reactor in a system where butane was oxidized to prepare maleic anhydride, whereby its activity had decreased. This was subjected to an activity test without any treatment. That is, the reaction was carried out in a fixed bed flow system reactor for test. Reaction conditions were set at an SV of 1200 hour$^{-1}$, a butane concentration of 1.5%, atmospheric pressure and a temperature of 430° C. The conversion of butane was 51 % and the selectivity to maleic anhydride was 64%.

Example 1

Twenty grams of the same catalyst as used in the Comparison Example was regenerated in treating apparatus comprising a glass cylinder with an inner diameter of 3 cm and a height of 1 m. On the upper end of the cylinder, a velocity reducing zone with a maximum inner diameter of 15 cm was added with a filter fitted on the top. A nozzle was provided in the center of a support plate fixed to the lower end of the cylinder. The upper end of the nozzle was approximately in the same plane as the upper end of the support plate. The inner diameter of the nozzle was 0.65 mm. Air was used as the high speed gas with a pressure at the nozzle of 3 kg/cm$^2$G and an air flow rate of 7.3 liters/minute and a linear velocity of the air flow in an outlet of the nozzle of 340 m/second. The regeneration treatment was carried out at 25° C. for 90 minutes.

Figure 3:
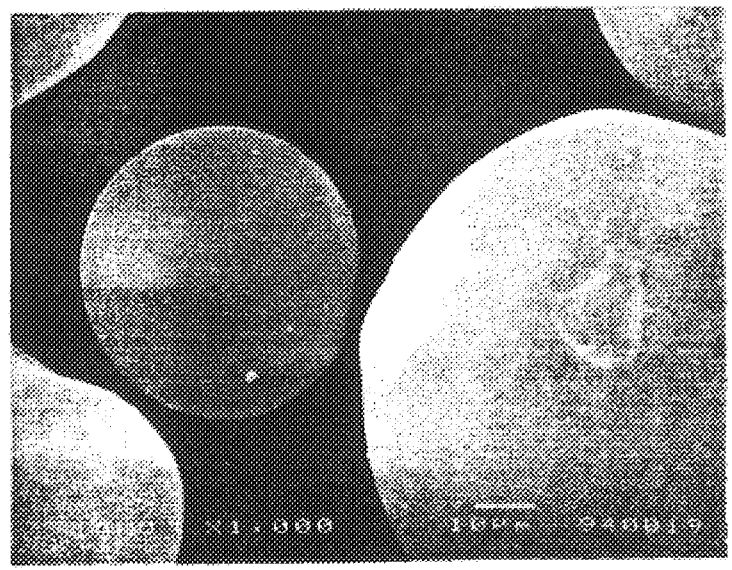
Figure 7:
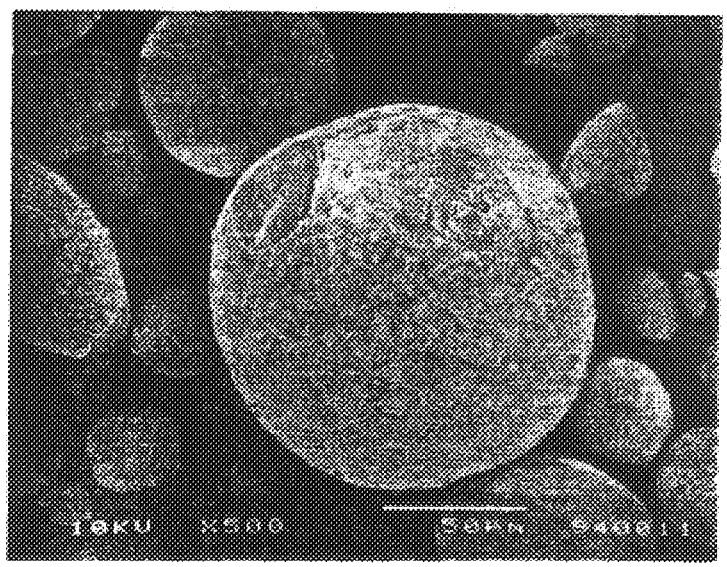
FIGS. 7 and 8 are photomicrographs which show particles after regeneration in a jetted bed with FIG. 7 being at 500 magnification and FIG. 8 at 1,000 magnification.
Figure 8:
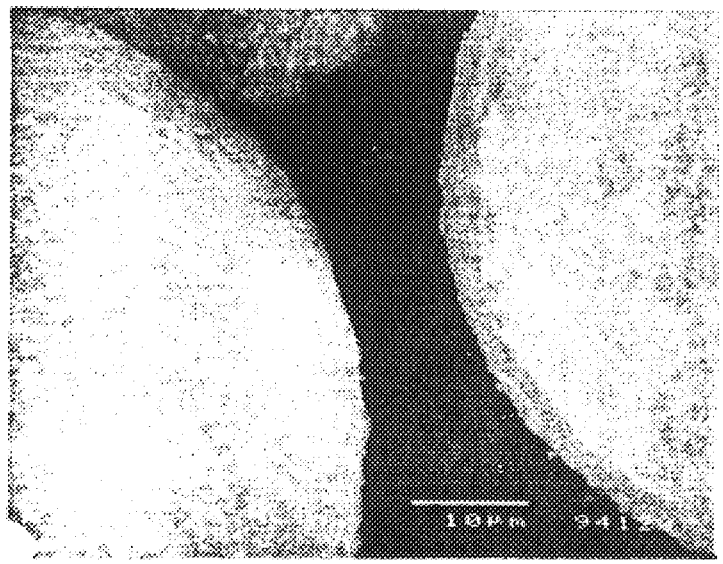

The particle size distribution of the catalyst particles after the regeneration treatment was determined. Although the average particle size was reduced by about 1 μm compared to that before the treatment, the particle size distribution was almost unchanged. The catalyst particles after the treatment were observed with a scanning electron microscope. FIG. 3 shows a photograph (magnification of 1000) of the catalyst before treated according to the invention. Photographs of the catalyst after the treatment are shown in FIG. 7 at a magnification of 500 and in FIG. 8 at a magnification of 1000. It is seen that the catalyst particles are not crushed and that the surface of the particles was evenly exfoliated.

The activity of the catalyst after the regeneration treatment was determined in the same fixed bed flow system reactor for activity test and in the same conditions as in the Comparison Example. The conversion of butane was 81% and the selectivity to maleic anhydride was 64%.

Examples 2 to 6

The regeneration treatment for the catalyst was carried out as in Example 1 with the exception that the conditions of the regeneration treatment were as shown in Table 3. The particle size distribution for the catalyst particles after the regeneration treatment was determined. The particle size distribution was almost unchanged in all of the Examples. In the observation with a scanning electron microscope, it was found that the catalyst particles were not crushed to any degree and the surface of the particles was evenly exfoliated. The catalytic activity after the treatment was determined in the same fixed bed flow system reactor for activity test and in the same conditions as in the Comparison Example. The results are as shown in Table 3.

TABLE 3

| Ex. | Air Flow Rate liter/min. | Inner Diameter of the Nozzle, mm | Velocity in an Outlet, m/sec. | Treatment Time, min. | Conversion of Butane, % | Selectivity to Maleic Anhydride, % |
|---|---|---|---|---|---|---|
| 1 | 7.3 | 0.65 | 340 | 90 | 81 | 64 |
| 2 | 5.3 | 0.65 | 272 | 90 | 66 | 64 |
| 3 | 7.3 | 0.80 | 248 | 90 | 65 | 64 |
| 4 | 7.2 | 1.00 | 156 | 90 | 59 | 65 |
| 5 | 7.3 | 0.65 | 340 | 30 | 70 | 64 |
| 6 | 7.3 | 0.65 | 340 | 15 | 64 | 65 |

Example 7

A nozzle with an inner diameter of 1 mm was provided to the bottom of a glass cylinder having a height of 1.3 m and an inner diameter of 15 cm. The catalyst was treated as in Example 1 with the amount of the catalyst being 500 g at an air flow rate of 16 liters/min. for 3 hours. The particle size distribution was almost unchanged during the treatment of the catalyst. The observation showed that the surface of the catalyst particle was evenly exfoliated. The catalytic activity after the treatment was determined under the same conditions as in the Comparison Example. The conversion of butane was 72% and the selectivity to maleic anhydride was 64%. The activity was greatly increased compared to that before the treatment. Nevertheless, there was no decrease in the selectivity.

We claim:

1. A process for the regeneration of a used catalyst in a process for the preparation of maleic anhydride by oxidizing a hydrocarbon having four carbon atoms in a fluidized bed reactor, wherein said used catalyst comprises particles of vanadium-phosphorus oxide compounds having a deteriorated outer layer of said vanadium-phosphorus oxide, said process comprising the steps of removing at least a portion of said used catalyst particles from said reactor, subjecting said removed used catalyst particles to impact whereby said deteriorated outer layer of said vanadium-phosphorus oxide is peeled away leaving regenerated catalyst particles, separating said peeled away deteriorated outer layer of said vanadium-phosphorus oxide from said regenerated catalyst particles and returning said regenerated catalyst particles to said reactor.

2. A process as recited in claim 1 wherein said steps of subjecting said removed used catalyst particles to impact and said step of separating said peeled away deteriorated outer layer of said vanadium-phosphorus oxide comprise the step of subjecting said removed used catalyst particles to pneumatic classification whereby said impacts and said separation both occur in said pneumatic classifier.

3. A process as recited in claim 1 wherein said step of subjecting said removed used catalyst particles to impact comprises the step of subjecting said particles to a gas flow jetted at a high pressure from a nozzle in a jet mill to cause said particles to collide whereby said deteriorated outer layer of said vanadium-phosphorus oxide is peeled away.

4. A process as recited in claim 3 wherein said jet mill includes a baffle and wherein said particles collide with each other and with said baffle.

5. A process as recited in claim 3 wherein said jet mill is of a fluidized bed type and wherein the treating energy E is greater than $2.5 \times 10^7$ and less than $5.0 \times 10^8$ and wherein $$E = \frac{\text{(jetting speed of gas in m/sec.)}^2}{\text{treating period in sec.}}$$

6. A process as recited in claim 1 wherein said step of subjecting said particles to impact comprises the step of subjecting said particles to a high speed gas flow jet to form a jetted bed of said particles whereby collisions occur between said particles to polish and remove said deteriorated outer layer of said vanadium-phosphorus oxide.

* * * * *